Figure 1:
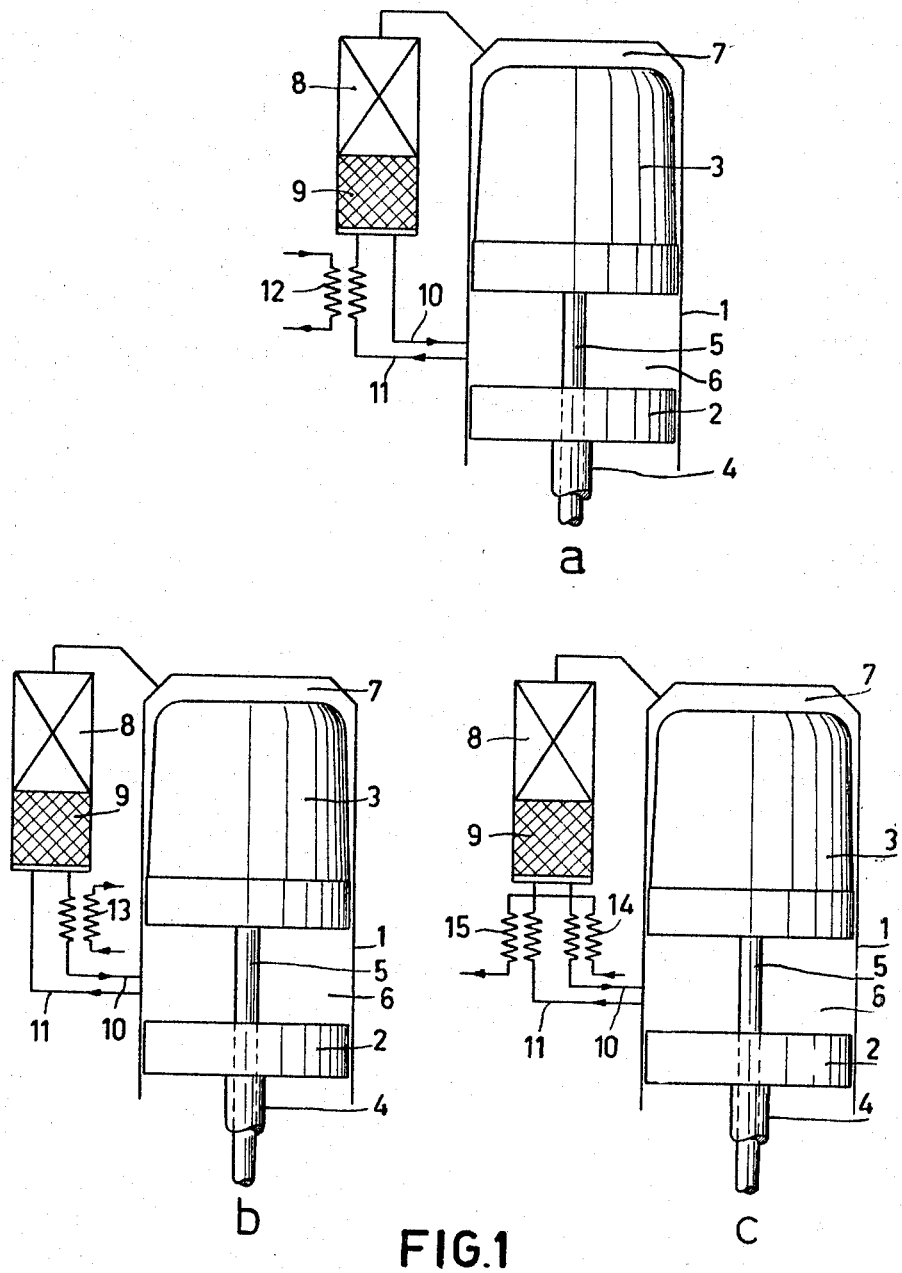

May 9, 1967 J. P. REINHOUDT ETAL 3,318,100
HOT-GAS RECIPROCATING APPARATUS
Filed July 16, 1965 7 Sheets-Sheet 1

INVENTORS
JACOBUS P. REINHOUDT
BY HERMAN FOKKER

AGENT

May 9, 1967 J. P. REINHOUDT ET AL 3,318,100
HOT-GAS RECIPROCATING APPARATUS
Filed July 16, 1965 7 Sheets-Sheet 2

INVENTORS
JACOBUS P. REINHOUDT
BY HERMAN FOKKER
AGENT

INVENTORS
JACOBUS P. REINHOUDT
BY HERMAN FOKKER
AGENT

May 9, 1967

J. P. REINHOUDT ET AL 3,318,100

HOT-GAS RECIPROCATING APPARATUS

Filed July 16, 1965

7 Sheets-Sheet 5

INVENTORS
JACOBUS P. REINHOUDT
BY HERMAN FOKKER

AGENT

May 9, 1967  J. P. REINHOUDT ETAL  3,318,100
HOT-GAS RECIPROCATING APPARATUS
Filed July 16, 1965

INVENTORS
JACOBUS P. REINHOUDT
BY  HERMAN FOKKER

AGENT

United States Patent Office 3,318,100
Patented May 9, 1967

3,318,100
HOT-GAS RECIPROCATING APPARATUS
Jacobus Pieter Reinhoudt and Herman Fokker, both of Emmasingel, Eindhoven, Netherlands, assignors to North American Philips Company, Inc., New York, N.Y., a corporation of Delaware
Filed July 16, 1965, Ser. No. 472,561
Claims priority, application Netherlands, July 24, 1964, 6,408,550
16 Claims. (Cl. 62—6)

The invention relates to a hot-gas reciprocating apparatus which comprises one or more compression spaces having a variable volume which communicate(s) with one or more expansion spaces which also has (have) a variable volume, the said spaces having different average temperatures during operation of the apparatus, at least one heat exchanger, for example, a regenerator, being arranged in the communication between each pair of these spacers.

In known apparatus of the type to which the present invention relates the working medium, on its way from one space to the other space and back, always flows through the same ducts. For reaching a good output, the thermal energy of the said known apparatus which, during compression of the medium in the compression space, comes in the working medium, must be conducted away. For conducting away the said thermal energy, a heat exchanger is provided between each of the spaces. A drawback of the known apparatus is that the working medium in this heat exchanger also always flows to and fro in the same duct, so that counter-current heat exchange is substantially not possible. This has for its result that the cooling medium is heated to a lesser extent than is possible with a counter-current heat exchanger, as a result of which large quantities of cooling medium are required. In circumstances, when the cooling medium is expensive, this may involve great cost which results in a worse total yield of the machine.

It is the object of the invention to mitigate the above drawback and the invention is characterized in that the communication between at least one pair of the said spaces is at least partially constituted by two sets of separated ducts, the machine comprising a control device which conducts the working medium, when it flows in one direction, through the first set of separated ducts, and, when it flows in the opposite direction, through the second set of ducts, at least one set of these ducts comprising a heat exchanger where the working medium exchanges heat.

Because, according to the invention, the apparatus now comprises a communication between the relative spaces which at least partially consists of ducts for flowing to and fro, the possibility is created of counter-current heat exchange.

A favourable embodiment of the hot-gas reciprocating apparatus according to the invention, in which a regenerator and a cooler are provided in the communication between each compression space and expansion space, is characterized in that the part of each communication located between one end face of the regenerator and the associated compression space is formed by at least two separated ducts, a cooler being arranged in one or both ducts and the apparatus comprising a control device which, when working medium flows from an expansion space to a compression space, conducts it substantially through the first duct, and, when working medium flows from the compression space to the expansion space, conducts it substantially through the second duct, each cooler being constructed so that a cooling medium can flow through that cooler in counter-current with the working medium.

According to a further favourable embodiment of the apparatus according to the invention the separated ducts each comprise a cooler between one end face of each regenerator and the compression space associated with that regenerator. According to a further embodiment the cooling medium flow through the two coolers in series and in counter-current with the working medium, the inlet and outlet for the cooling medium being arranged on the side of the cooler facing the compression space. In this manner a maximum heating of the cooling medium is obtained between the inlet and outlet, so that a minimum quantity of cooling medium is sufficient.

A favourable embodiment of the hot-gas reciprocating apparatus according to the invention which comprises one or more cylinders with reciprocating piston-shaped members for varying the volume of the compression and expansion spaces respectively is characterized in that the said communication ducts between each of the regenerators and the compression space associated with those regenerators are connected to ports in the cylinder wall, all the ports associated with those ducts through which the medium flows on its way from the compression space to the expansion space lying on the same level and all the ports associated with the ducts through which the medium can flow on its way from the expansion space to the compression space also lying on the same level, the levels at which the ports lie being chosen to be so, that the piston-shaped member which can vary the volume of the expansion space and/or the piston-shaped member which can vary the volume of the compression space alternately close and release the said ports. This embodiment of the hot-gas reciprocating apparatus according to the invention is based on the recognition of the fact that the said apparatus can be proportioned so that the instant at which the streams of medium in the communication between the two spaces reverse their directions substantially coincides with the instant at which the piston-shaped members are in their central position. This creates the possibility of positioning the ports at a level such that the said ports are released and closed at the correct instants by the piston-shaped members. In this case the ports lie at a level such that a total closure of the communication between the relative spaces never occurs. So there always is a communication between the two spaces.

In a further embodiment of the hot-gas reciprocating apparatus according to the invention which is constructed as a displacer apparatus all the ports are provided in a part of the cylinder wall which cooperates with the piston, the ports associated with the communication ducts through which the working medium can flow on its way from the compression space to the expansion space lying at a higher level than the ports associated with the ducts through which the medium can flow on its way from the expansion space to the compression space, the piston being provided on its circumference with recesses of which the axial dimension is at least substantially equal to the distance between the levels at which the ports lie and the upper limit of which is located at a distance substantially equal to half the length of a stroke of the end face of the piston, the recesses communicating with the compression space through one of more further ducts. This embodiment of a hot-gas reciprocating apparatus according to the invention is based on the recognition of the fact that the displacer apparatus the piston is just in its central position when the medium flowing through the ports reverses its direction. In this manner an extremely simple operation for closing and releasing the ports with the piston alone, so without introduction of additional moving components, is obtained.

In a further favourable embodiment of the hot-gas reciprocating apparatus according to the invention, which is constructed as a displacer apparatus, the ports associated with those communication ducts through which the medium can flow on its way from the expansion space to the compression space lie at a higher level than the ports associated with the ducts through which the medium can flow on its way from the compression space to the expansion space, the distance between the two levels being substantially half the length of a stroke, the latter ports cooperating with one or more recesses in the piston, the upper limit of the said recesses being at substantially half the length of a stroke of the end face of the piston, and the said recesses communicating with the compression space through one or more further ducts.

In the above described two embodiments of the hot-gas reciprocating apparatus according to the invention the ports through which the medium can flow from and to the compression space lie at different levels.

According to a further embodiment of the hot-gas reciprocating apparatus according to the invention all the gates lie at the same level, the piston being provided at its circumference with two groups of recesses, the recesses of one group cooperating with the port of the ducts through which the medium can flow from the compression space to the expansion space and the recesses of the other group cooperating with the ports of the ducts through which the medium can flow from the expansion space to the compression space, the two groups of recesses being shifted with respect to each other in the axial direction in a manner such that alternately the ports through which the medium can leave the compression space and the ports through which the medium can enter the compression space are released and closed.

According to a further embodiment of the hot-gas reciprocating apparatus according to the invention one or more non-return valves are arranged in each of the communication ducts between the regenerator and the compression space, the non-return valves in one duct permitting flow of medium in the direction of the compression space, the non-return valve in the other duct permitting flow of medium in the direction of the expansion space.

In a further embodiment of the hot-gas reciprocating apparatus according to the invention the flow of medium through the two separated communication ducts is controlled by a slide construction which is moved in the correct phase and which closes and releases the communication ducts at the instant at which the medium reverses its direction of flow.

In a further embodiment of a hot-gas reciprocating apparatus of the displacer type according to the invention the sealing between the piston and the cylinder and the displacer rod respectively is constituted by rolling diaphragms. This apparatus is characterized in that at least the port of the compression space which adjoins the rolling diaphragm provided between the piston and the displacer rod is separated from the compression space by a gap sealing, the said sealing being arranged at a diameter such that the space adjoining the rolling diaphragm in question constitutes an expansion space, a control device being provided which communicates the outlet side of that cooler through which the medium flows on its way from the expansion space to the compression space with the space adjoining the rolling diaphragm in question substantially at the instant at which medium starts flowing from the compression space to the expansion space, the said control device further closing the communication between that cooler and the space adjoining the rolling diaphragm at the instant at which medium begins to flow from the expansion space to the compression space and effects the communication between the said space and the compression space. It is known that rolling diaphragms operate less satisfactorily at higher temperatures. The cause of this is first of all that the material strength deteriorates somewhat and further that the diffusion possibility increases. By ensuring according to the invention that the space which adjoins the rolling diaphragm forms an expansion space, the rolling diaphragm will be cooled by the expanding medium. The medium which enters the expansion spaces which adjoin the rolling diaphragm comes from the cooler through which, during the other half of the cycle, medium flows from the expansion space to the compression space. So this medium will enter the expansion space in a thoroughly cooled condition so that during the expansion a fall in temperature is obtained which is as large as possible. During the other half of the cycle the expanded medium is applied to the compression space where it effects a fall in temperature of the medium in that space to some extent. In principle it is sufficient to construct only that space which adjoins the rolling diaphragm between the piston and the displacer rod as an expansion space, the medium supplied to and conducted away from that space being conducted through ducts in the piston and consequently readily cools the said piston body. According to a further favourable embodiment of the hot-gas reciprocating apparatus according to the invention, the part of the compression space which adjoins the two rolling diaphragms is separated from the compression space by a gap sealing, the said sealing being arranged at diameters such that the spaces adjoining the rolling diaphragms constitute expansion spaces which communicate with one another. So in this case the sides of the rolling diaphragms facing those expansion spaces are directly cooled by the expanding medium, the other side of the rolling diaphragm extending against a wall portion of the cooled piston. In these embodiments of a hot-gas reciprocating apparatus according to the invention the control device which conducts the medium alternately through one and through the other cooler may again be formed by ports which cooperate with recesses in the piston. Alternatively it is possible, naturally, for the control of the flows of medium to use non-return valves or a slide construction.

The invention further relates to a hot-gas reciprocating apparatus which comprises three spaces which communicate with one another, the volume of the said spaces being varied by two piston-shaped members with a phase difference such that in one space substantially compression takes place and in the two other spaces substantially expansion takes place. In this case the average temperature in one of the expansion spaces is higher and the average temperature in the other expansion space is lower than in the compression space, each of the expansion spaces communicating with the compression space through at least one heat exchanger, for example, a regenerator. This apparatus according to the invention is characterized in that at least one of the two expansion spaces communicates with the compression space through separated ducts between the one regenerator end face and the compression space, a cooler being arranged in at least one of the said ducts and the apparatus comprising a control mechanism which conducts the medium, when it flows to the expansion space in question, through one duct and, when it flows out of the expansion space, through the other duct. So in this apparatus also the possibility exists of counter-current cooling, as a result of which in the circumstances the required quantity of cooling medium can drastically be reduced. In this apparatus also the control of the flow of medium through the separated ducts can again be controlled by non-return valves or a separate slide construction. According to a further favourable embodiment of this apparatus the separated ducts debouch into ports in a compression cylinder, the said gates being alternately closed and released in cooperation with one of the piston-shaped members and recesses in that member. In the description of the figures the operation of this hot-gas reciprocating apparatus will be further explained.

A further favourable embodiment of the hot-gas reciprocating apparatus according to the invention is characterized in that the communication between the colder expansion space and the compression space is constituted by two separated ducts, the apparatus comprising a control device for conducting the working medium through the first duct when it flows to that expansion space and for conducting it through the second duct when it flows from that space, a cooler being incorporated in the first duct in which the medium is cooled in counter-current with a cooling medium, and a heat exchanger being incorporated in the second duct in which the working medium is heated in counter-current with a warmer medium.

In order that the invention may readily be carried into effect a number of hot-gas reciprocating apparatus will now be described in greater detail by way of example, with reference to the accompanying diagrammatic drawings, in which, FIG. 1 diagrammatically shows three cross-sectional views of structural embodiments of hot-gas reciprocating apparatus, in which the communication between one face of the regenerator and the compression space is constituted by two separated ducts, a cooler being arranged in at least one of the said ducts.

FIGS. 2 to 5 diagrammatically show cross-sectional views of hot-gas reciprocating apparatus in which the separated ducts between one end face of the regenerator and the compression space are connected, through ports, to a part of the cylinder wall which cooperates with the piston, the piston being provided with one or more recesses which cooperate with the said ports.

Figure 6:
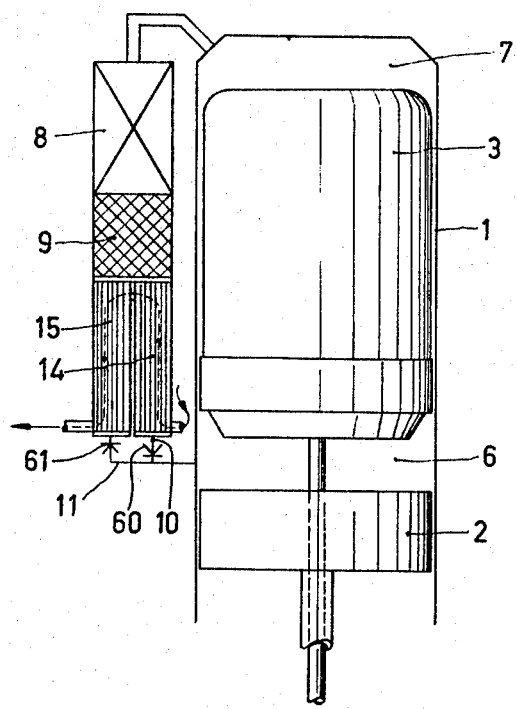

FIG. 6 shows an embodiment of a hot-gas reciprocating apparatus, in which non-return valves are included in the ducts between the one end face of the regenerator and the compression space.

Figure 7:
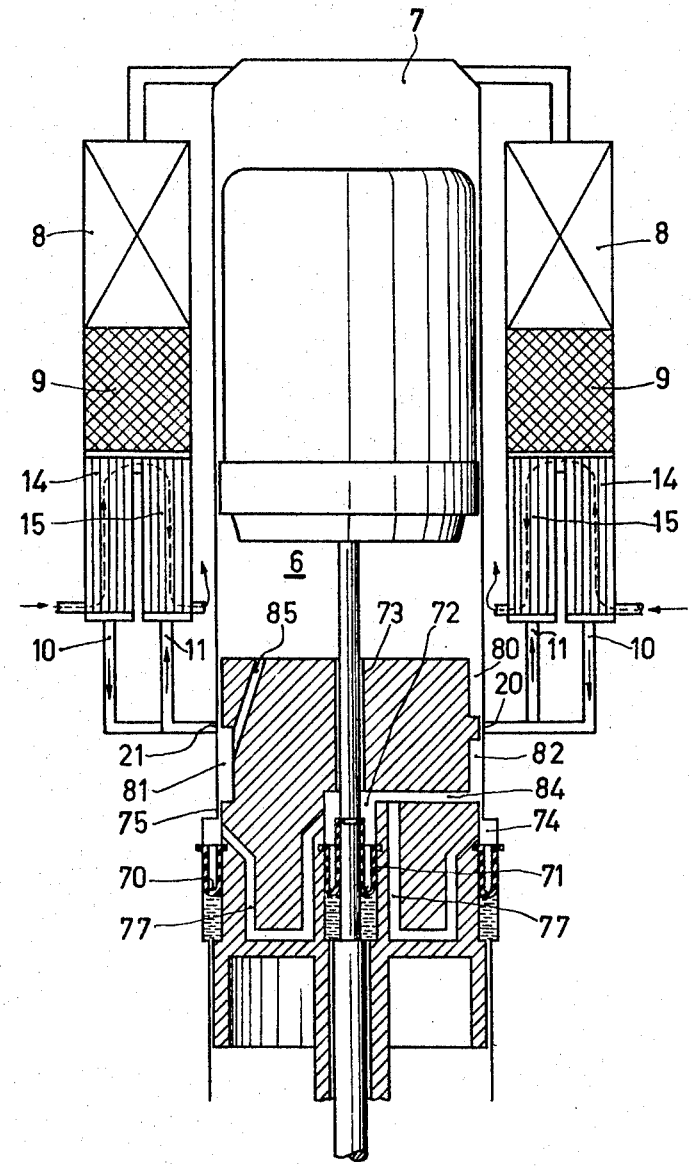

FIG. 7 diagrammatically shows a cross-sectional view of a hot-gas reciprocating apparatus in which the communication between one end face of the regenerator and the compression space is again constituted by two separated ducts in which a cooler is provided in both ducts while the sealing between the piston and the cylinder and the displacer rod respectively is constituted by rolling diaphragms, the spaces adjoining the said rolling diaphragms constituting expansion spaces which, by means of a control device, can be made to communicate alternately with the end face of the cooler through which the medium flows on its way from the expansion space to the compression space, and with the compression space itself.

Figure 8:
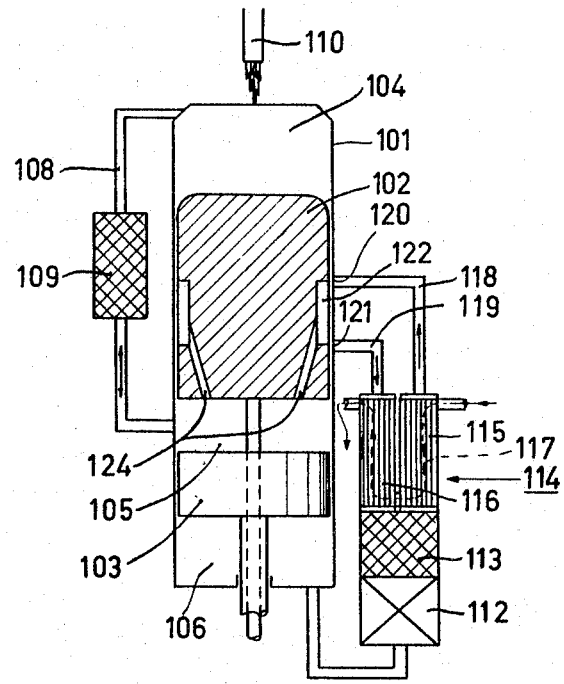
Figure 9:
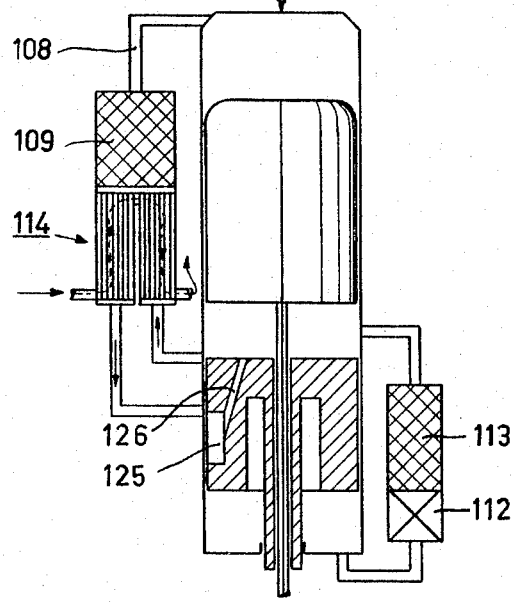

FIGS. 8 and 9 diagrammatically show two hot-gas reciprocating apparatus each comprising two expansion spaces and one compression space which communicate with one another, the communication between one of the expansion spaces and the compression space being constituted at least partly by two ducts which comprise each or one of them a counter-current cooler.

Figure 10:
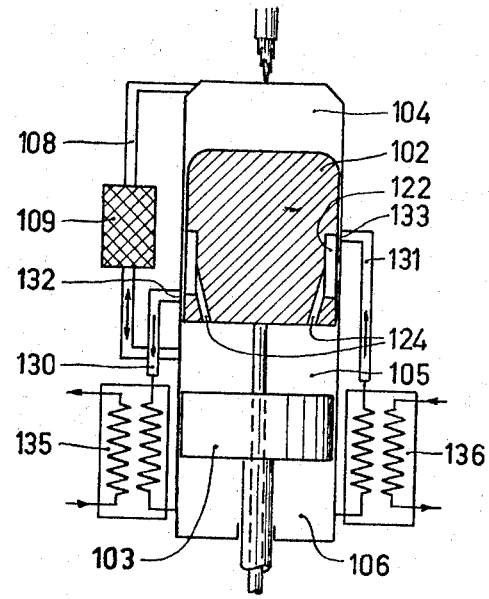
Figure 11:
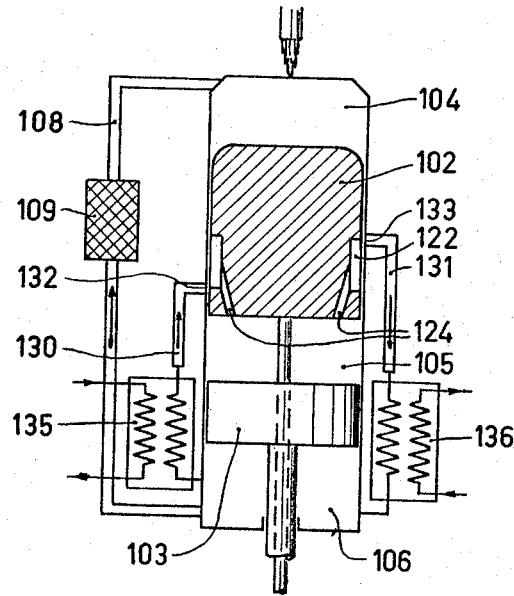

FIGS. 10 and 11 show two embodiments of hot-gas reciprocating apparatus which also contain two expansion spaces and one compression space, the warmer expansion space communicating through a regenerator with the compression space and the colder expansion space communicating with the compression space through a cooler and a heat-exchanger.

FIG. 1 diagrammatically shows a hot-gas reciprocating apparatus which comprises a cylinder 1 in which a piston 2 and a displacer 3 are movably arranged. The piston 2 and the displacer 3 are provided with a piston rod 4 and a displacer rod 5 respectively which constitute the connection between the piston and the displacer respectively and a gearing not shown. During operation the piston 2 varies the volume of a compression space 6 and the displacer 3 varies the volume of an expansion space 7. The compression space and the expansion space communicate with one another through a heater 8—in the case of a cold-gas refrigerator the said heat exchanger is generally termed freezer—a regenerator 9 and two separated ducts 10 and 11 between the regenerator and the compression space 6.

The apparatus further comprises a control device which is not shown in this figure and which conducts the working medium, when it flows from the compression space to the expansion space, through the duct 11 and, when it flows from the expansion space to the compression space, through the duct 10. At some point between the regenerator and the compression space the working medium must transmit heat to a cooling medium. To realize this, FIG. 1a includes a cooler 12 in the duct 11 in which cooling medium exchanges heat in counter-current with working medium. Further it is possible, as shown in FIG. 1b to provide a cooler 13 in the duct 10. If desired, as shown in FIG. 1c, coolers 14 and 15 may be arranged in the two ducts 10 and 11. Since now according to the invention ducts for flowing to and fro are provided, counter-current cooling may be used without objection. As a result of this it has become possible to heat the cooling water to a considerably higher temperature between the inlet and the outlet, so that it is sufficient to use a much smaller quantity of cooling water than is the case in the known construction of this type of apparatus. It has been found that the quantity of cooling water can be reduced by a factor 5 to 10.

Figure 2:
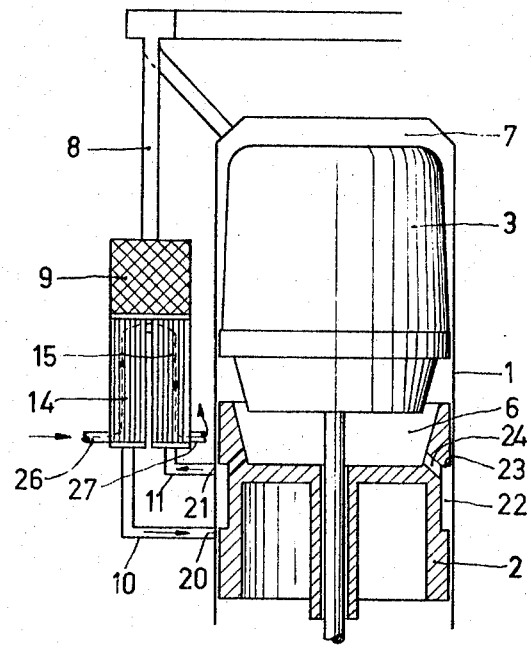

FIG. 2 shows a hot-gas reciprocating apparatus. In this corresponding components are denoted by the same reference numerals as in FIG. 1. In this apparatus, the ducts 10 and 11 debouch on ports 20 and 21 respectively in the cylinder 1. In this embodiment all the ports 20 lie at the same level as well as the ports 21, the distance between the said levels substantially corresponding to half the length of a stroke of the piston 2. The piston is further provided with a recess 22 which has an axial dimension which is substantially equal to the distance between the two said levels. The upper limit 23 of the recess 22 lies at a distance which is substantially equal to half the length of a stroke of the top of the piston 2. The recess 22 communicates with the compression space through apertures 24. The distance between the ports 20 and 21 and the proportions and location of the recess 22 must be such that always one of the sets of ports 20 or 21, or both for a short period of time, communicate with the compression space 6 so that a complete closure of the communication between the expansion space and the compression space can never occur.

The way of controlling the flow of medium through the ducts 10 and 11 as shown in this figure is based on the recognition of the fact that the flow of the medium through the ports 20 and 21 just reverses at the instant the piston is in its central position. In the figure the piston 2 is shown in its central position. When the piston moves upwards further the port 21 is released and the port 20 is closed. The working medium then flows from the compression space 6 through apertures 24, recess 22 and port 21 into the duct 11 and thence through cooler 15, regenerator 9 and heater 8 to the expansion space 7. This communication is maintained until the piston, during its downward stoke, again passes its central position. When the piston moves further downwards, the port 20 is released and the port 21 is closed. The medium can now reach the compression space 6 from the expansion space 7 through the heater 8, regenerator 9, cooler 14, duct 10, port 20, recess 22 and apertures 24. So in this manner with very simple means and without additional moving components being required a control of the flow of medium is obtained.

The inlet aperture 26 of the cooler 14 and the outlet aperture 27 of the cooler 15 are arranged on the side of the said coolers facing the compression space. The cooling water flows through the coolers 14 and 15 in series as is indicated by a broken line, the cooling water being heated substantially from the temperature with which the working medium enters the compression space 6 to the temperature with which the working medium again leaves the said space. The increase in temperature of the cooling water now is substantially equal to the adiabatic rise in temperature of the medium in the compression space.

Figure 3:
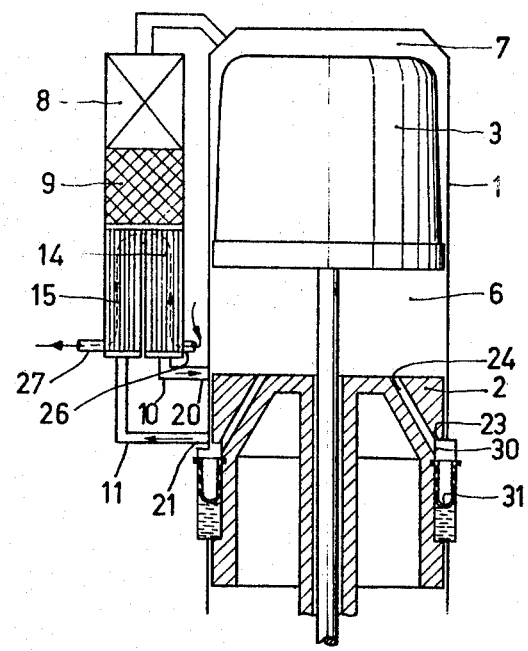
Figure 4:
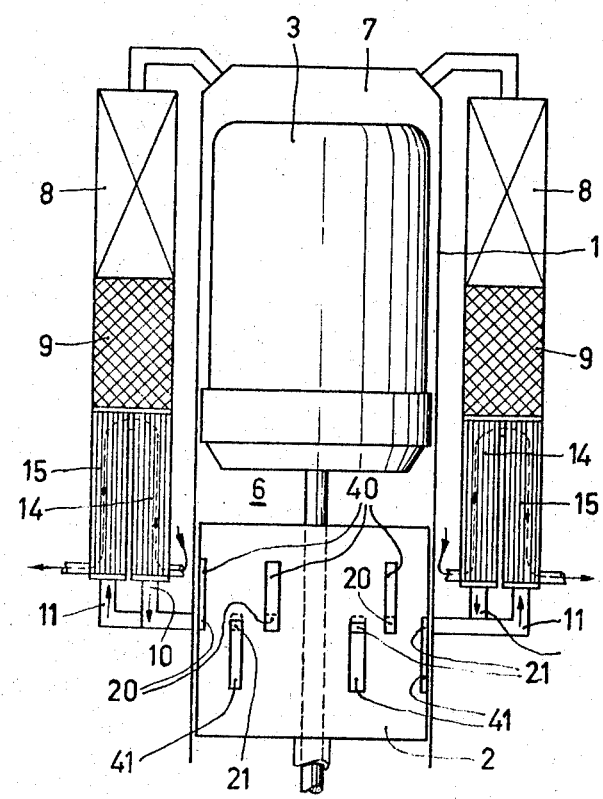
Figure 5:
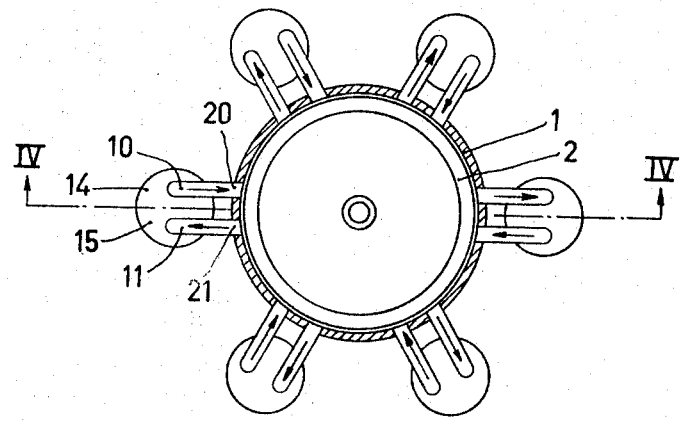

FIG. 3 diagrammatically shows a different embodiment of a hot-gas reciprocating apparatus. In this embodiment also corresponding components are again denoted by the same reference numerals. The duct 10 through which medium flows to the compression space 6 in this embodiment debouches through ports 20 in the cylinder 1, the said ports 20 lying at a higher level than the ports 21 to which the ducts 11 through which medium can flow from the compression space are connected. The distance between the levels at which the ports 20 and 21 lie is substantially half the length of a stroke. The ports 20 are now alternately released and closed by the top of the piston 2, while the ports 21 cooperate with a recess 30. The upper side of this recess is located at substantially half the length of a stroke of the end face of the piston. In this embodiment the recess 30 comprises a rolling diaphragm 31 as a sealing which is supported by liquid. It will be clear that instead of a rolling diaphragm sealing a different sealing might be used in this case also without influencing the principle on which the invention is based.

FIGS. 4 and 5 again show a hot-gas reciprocating apparatus of the same structure as in the preceding figures. The ducts 10 and 11 through which the medium can flow to the compression space and out of the compression space respectively are again connected to ports 20 and 21 respectively. In this case all the ports 20 and 21 lie at the same level. The ports 20 are distributed over the circumference of the cylinder 1 in a manner such that they are located just opposite to recesses 40 in the piston 2. The ports 21 cooperate with recesses 41. As may be seen from the drawing one group of recesses 40 lies higher than the other group of recesses 41. When the piston 2 is below its central position, the compression space 6 communicates with the expansion space through recesses 40, ports 20 and duct 10, whereas, when the piston is above its central position, the compression space communicates with the expansion space through recesses 41, ports 21 and duct 11.

In this manner again a hot-gas reciprocating apparatus is obtained in which the piston is used as a control slide for controlling the flow of medium and in which a counter-current cooler can be used as a cooler. In this embodiment the axial dimension of the piston, as is the case in the embodiment shown in FIG. 3, need be only little more than the length of a stroke, whereas in the embodiment shown in FIG. 2 the axial dimension of the piston must be at least one and one half times the length of a stroke.

In FIG. 6 finally a hot-gas reciprocating apparatus is diagrammatically shown in which non-return valves 60 and 61 respectively are provided in the ducts 10 and 11. These valves open in opposite directions, so that through duct 10 medium can flow to the compression space 6 and through duct 11 medium can flow out of the compression space.

FIG. 7 diagrammatically shows in cross-section a hot-gas reciprocating apparatus constructed as a hot-gas reciprocating engine. This apparatus again comprises the same main components as the apparatus shown in the preceding figures and corresponding components are therefore denoted by the same reference numerals. In each of the communications between the compression space 6 and the expansion space 7 a heater 8, a regenerator 9 and a cooler which consists of two parts 14 and 15 are again arranged. The sealing between the piston 2 and the cylinder 1 is constituted by a rolling diaphragm 70, and the sealing between the piston 2 and the displacer rod 3 is also formed by a rolling diaphragm 71. The space 72 which adjoins the rolling diaphragm 71 is separated from the compression space 6 by a gap sealing 73 which has a smaller diameter than the effective diameter of the rolling diaphragm. This means that the volume variations of the space 71 are in counter phase with those of the compression space 6 so that the space 71 constitutes an expansion space.

The space 74 which adjoins the rolling diaphragm 70 is also separated from the compression space by a gap sealing 75 which is arranged at a smaller diameter than the effective diameter of the rolling diaphragm 70. In view of the fact that the piston 2 in a hot-gas engine actually is an expansion piston and the rolling diaphragm 70 moves in phase with that piston, the space 74 also constitutes an expansion space. In the case of a cold-gas refrigerator, in which the piston 2 is a real compression piston, the gap sealing 75 should be arranged at a greater diameter than the effective diameter of the rolling diaphragm, so that in that case the volume variations of the space 74 are in counter phase with the volume variations caused by the piston 2. In this case again substantially expansion occurs in the space 74. The spaces 72 and 74 communicate with one another through the duct 77. The piston 2 is further provided with a number of recesses 80, 81, and 82 distributed on its circumference.

The recesses 80 are in open communication at one side with the compression space 6, while the lower limit of those recesses, when the piston 2 is in its central position, substantially closes the ports 20 of the ducts 10 through which working medium can flow to the compression space.

The recesses 82 are located in axial direction below the recesses 80 and have an upper limit which, in the central position of the piston 2, also substantially closes the ports 20. The recesses 82 further each communicate, through a duct 84 and a duct 77, with the spaces 72 and 74.

The recesses 81 each communicate with the compression space 6 through a duct 85. These recesses have an axial dimension which is substantially equal to half the length of a stroke, the upper limit of these recesses in the central position of the piston 2 substantially registering with the ports 21 of the ducts 11. The lower limit of the recesses 81 releases a communication between the space 74 and the recesses 81 when the piston 2 moves downwards.

The operation of the device is as follows.

When the piston 2 moves upwards from the central position shown, the recesses 81 release the ports 21 so that working medium can flow to the expansion space 7 out of the compression space through ducts 85, recesses 81, ducts 11, cooler 15, regenerator 9 and heater 8. Simultaneously the recesses 82 release the ports 20. As a result of this working medium which has left the compression space 6 through the ports 81 can enter the cooler 14 after the passage of the cooler 15 and thence enter the spaces 71 and 74 through the ducts 10, ports 20 and recesses 82 which spaces, as already described, both constitute expansion spaces and the volume of which varies in a manner such that the working medium wants to flow to these spaces 72 and 74 simultaneously with the working medium leaving the compression space 6. So medium enters the spaces 72 and 74 which has delivered its heat of compression in the coolers 15 and 14 in counter-current with the cooling water. During the subsequent downward stroke of the piston 2 the medium in the expansion 7 expends but also the medium in the spaces 72 and 74. As a result of this the medium in the spaces 72 and 74 becomes colder so that the rolling diaphragms 70 and 71 respectively are readily cooled. At the instant the piston 2 passes its central position, the ports 21 are closed and the ports 20 are made to communicate with the recesses 80. Further the space 74 is made to communicate with the recesses 81. Now medium can flow from the expansion space 7 to the compression space 6 via the heater 8, regenerator 9, cooler 14, ducts 10 and recesses 80. Further the medium from the spaces 72 and 74 which is still cold can enter also the compression space through the recesses 81 and ducts 85 where the cold still present in the medium contributes to keeping the compression space at a low temperature. The medium from the space 72 flows through the ducts 77 in the piston body, this medium cooling the piston body. The advantage of this is that not only those sides of the rolling diaphragm 71 and 70 which face the spaces 72 and 74 respectively are readily cooled but also that the rolling diaphragms with their other sides engage the cooled piston wall. In this manner an extremely good cooling of the rolling diaphragms is obtained as a result of which they obtain a longer life and further the diffusion is minimized.

Although in the embodiment shown both spaces 72 and 74 are constructed so that they constitute expansion spaces, it is sufficient in circumstances to construct the space 72 alone as an expansion space. The cold medium obtained in the said space still flows through ducts in the piston and more or less touches the rolling diaphragm 70. So the piston becomes cold and the rolling diaphragms both uncoil against cooled parts of the piston wall.

Alternatively it is possible in circumstances to form another additional expansion space in this piston instead of the spaces adjoining the rolling diaphragm, for example, by incorporating a piston-shaped body connected to the cylinder wall in a cylindrical aperture provided in the piston.

FIG. 8 diagrammatically shows a hot-gas reciprocating apparatus which comprises a cylinder 101 which is closed at both ends. This cylinder 101 comprises two piston-shaped members 102 and 103 respectively. During operation the said pistons vary the volume of three intercommunicating spaces 104, 105 and 106. The phase difference between the movements of the piston 102 and 103 is such that in the space 105 substantially compression occurs and in the spaces 104 and 106 substantially expansion occurs.

The space 104 communicates with the compression space 105 through a heater 108 and a regenerator 109. Owing to the fact that heat is supplied to the heater 108 by means of a burner 110 the space 104 during operation has a higher average temperature than the compression space 105.

The space 106 also communicates with the compression space 105 through a freezer 111 and a regenerator 113 and a cooler 114. During operation the said expansion space 106 has a lower average temperature than the compression space 105.

The energy supplied by the burner 101 can be just sufficient for overcoming losses of friction. At one side heat is supplied to the machine and at the other side the said machine produces cold. Further details regarding the operation and construction of the said apparatus are described in U.S. patent specification 2,657,552.

In this apparatus also the principle of counter-current cooling according to the invention can be used. For that purpose the cooler 114 is divided into two parts 115 and 116 through which cooling water flows in series as indicated in the drawing by the broken line 117.

The parts of the cooler 115 and 116 are connected to ducts 118 and 119 respectively. These ducts are connected to ports 120 and 121 in the cylinder wall. The piston-shaped body 102 is further provided with a recess 122, the axial limits of which are such that in the central position of the said piston-shaped member the said limits exactly register with the ports 120 and 121. When the piston-shaped member 102 is moved upwards the ports 120 are released and the ports 121 are closed. As a result of this working medium can flow out of the space 106 via the regenerator 113, cooler 115 and duct 118 through the recess 122 and ducts 124 to the compression space 105.

When the piston-shaped member 102 moves from its central position upwards the ports 121 are released and the ports 120 are closed. Now medium can flow out of the compression space 105 through the duct 119 to the expansion space 106. As a result of this again a hot-gas reciprocating apparatus is obtained in which a counter-current cooler is used while making use of one of the piston-shaped members as a distribution slide of the flow of medium. In the embodiment of the apparatus shown in FIG. 8 the cooler is arranged in the communication between the spaces 105 and 106. In the machine shown in FIG. 9 the cooler 114 is arranged in the communication between the spaces 105 and 104. This does not influence the operation of the device as such. However, for controlling the flow of medium the piston-shaped member 103 must be used in this case. For that purpose this member is provided with a recess 125 which communicates with the compression space 105 through a duct 126. After the above explanation, the operation of this apparatus need not further be described.

FIG. 10 shows a hot-gas reciprocating apparatus which, in outline, is equal to the machine shown in FIG. 8 in as far as its construction is concerned. The only difference in this embodiment is that the communication between the compression space 105 and the expansion space 106 has been constructed somewhat differently.

This communication is now formed by one or more ducts 130 and one or more ducts 131. The ducts 130 are connected to ports 132 and ducts 131 to ports 133 in the cylinder wall. The piston-shaped member 102 is again provided with recesses 122 which are arranged so that flow of medium out of the compression space 105 to the expansion space 106 can take place through ducts 130 and flow from the expansion space 106 to the compression space 105 takes place through the ducts 132. A cooler 135 is incorporated in the ducts 130 where the medium is cooled in counter-current with cooling water before entering the expansion space 106. In the ducts 131 a heat exchanger 136 is incorporated where the medium, which is expanded in expansion space 106 and consequently is cold, is in counter-current heat exchange with a medium to be cooled, for example, air. So in this manner a self-driving aggregate is obtained in which at the one side (space 104) heat is applied and on the other side (space 106) cold is produced. So in this embodiment no regenerator is arranged between the compression space 105 and the expansion space 106 and the medium is heated in heat exchanger 136 from the expansion temperature to the compression temperature. Consequently the cold is not only supplied at the lowest temperature, but the apparatus now has a cooling range (heat exchanger 136) so that the cold is obtained with a better yield.

In FIGS. 8 to 10 the compression space 105 was always arranged between the expansion spaces 104 and 106. That different constructions are possible also is shown in FIG. 11 in which the colder expansion space is arranged between the warmer expansion space and the compression space.

Although in the drawing hot-gas reciprocating apparatus of the displacer type have been shown as examples, it will be clear that the invention can also be used in hot-gas reciprocating apparatus of the two-piston-type.

What is claimed is:

1. A hot gas reciprocating apparatus comprising a cylinder provided with a working medium therein, a piston adapted for reciprocation in said cylinder, a displacer in said cylinder, said piston, displacer and cylinder forming at least one compression space having a variable volume of said working medium and at least one expansion space having a variable volume of said working medium, said spaces when operative having different average temperatures and communicating with each other, a firts heat exchanger arranged in said communication between said spaces, at least two separate ducts connecting said first heat exchanger with one of said spaces, a control device in said apparatus which when said working medium flows in one direction conducts said working medium through one of said separate ducts and when said working medium flows in the other direction conducts said working medium through the other of said separate ducts, and at least one of said ducts comprising a second heat exchanger wherein said working medium exchanges heat.

2. A hot gas reciprocating apparatus as claimed in claim 1 wherein said first heat exchanger is a regenerator, said two separate ducts being connected to one end of said regenerator, a cooler being arranged in one of said ducts and having a cooling medium therein and whereby when said medium flows from said expansion space to said compression space said medium is conducted through one of said ducts and when said medium flows from said compression space to said expansion space said medium is conducted through the other of said ducts, said cooler being so constructed that the cooling medium flows therethrough in counter-current with said working medium.

3. A hot gas reciprocating apparatus as claimed in claim 2 wherein each of said two separate ducts is provided with a cooler connected between said regenerator and the compression space associated with said regenerator.

4. A hot gas reciprocating apparatus as claimed in claim 3 wherein said cooling medium flows through said two coolers in series and in counter-current with said working medium, the inlet and the outlet for said cooling medium beng arranged on the side of said coolers facing said compression space.

5. A hot gas reciprocating apparatus as claimed in claim 2 wherein said cylinder is provided with groups of spaced ports in the cylinder wall, said separate ducts being connected to groups of spaced ports, each of said groups of ports connected to said ducts through which the working medium flows from the compression space to the expansion space lying in the same plane, and the group of ports connected to said ducts through which the working medium can flow from said expansion space to said compression space lying in the same plane but different from said first mentioned plane, the planes in which said ports lie being chosen so that the piston can vary the volume of the expansion space and the piston can vary the volume of said compression space to thereby alternately close and open said ports.

6. A hot gas reciprocating apparatus as claimed in claim 5 wherein said ports are located in the part of said cylinder wall co-acting with said piston and at different planes, the ports being connected to the duct through which said working medium flows from said compression space to said expansion space being at a higher level than the port connected with said duct through which the working medium flows from the expansion space to said compression space, the piston in said cylinder having at least one recess in its circumference, the axial proportion of said recess being at least substantially equal to the distance between said planes at which said ports lie.

7. A hot gas reciprocating apparatus as claimed in claim 5 wherein said ports are located in the part of said cylinder wall co-acting with said piston, said piston being provided with at least one recess, the group of ports connected to the ducts through which said working medium can flow on its way from the expansion space to the compression space lying at a higher plane than the group of ports connected to the ducts through which the medium can flow on its way from the compression space to said expansion space, the distance between said two planes being substantially half the length of a stroke of the end face of said piston, the last mentioned ports co-acting with said recess in said piston.

8. A hot gas reciprocating apparatus as claimed in claim 5 further comprising a plurality of ports in the cylinder wall and located on the same plane wherein the ducts between said regenerator and said compression space are connected to that part of the cylinder wall which co-acts with said piston, said piston being provided at its circumference with two groups of recesses, the recesses of one of said groups co-acting with the ports of said ducts through which said medium is adapted to flow from said compression space to said expansion space and the recesses of the other group co-acting with the ports of the ducts through which said medium is adapted to flow from the expansion space to said compression space, and said two groups of recesses being located axially relative to each other whereby alternately the ports through which said medium can leave the compression space and the ports through which the medium can enter the compression space are opened and closed.

9. A hot gas reciprocating apparatus as claimed in claim 2 further comprising at least one non-return valve arranged in each of said ducts between said regenerator and said compression space, the non-return valve in one of said ducts permitting flow of said medium in the direction of said compression space, and the non-return valve in the other of said ducts permitting flow of said medium in the direction of said expansion space.

10. A hot gas reciprocating apparatus as claimed in claim 2 wherein said piston reciprocates in said cylinder and is so shaped that it forms said control device that operates the alternate closing and opening of said separate ducts in the proper sequence.

11. A hot gas reciprocating apparatus as claimed in claim 3 further comprising a displacer provided with a displacer rod and adapted for reciprocation in said cylinder out of phase with the reciprocation of said piston, a rolling diaphragm seal between said piston and cylinder, a gap seal between said piston and said displacer rod and adjacent to at least part of said compression space, an additional space connected to said compression space by said gap seal being so dimensioned to constitute a second expansion space, a second control device which communicates with the outlet side of said cooler and through which said medium flows from said expansion space to said compression space substantially simultaneously with the flow of said medium from said compression space to said expansion space, said control device further closing at the instant said medium begins to flow from said expansion space to said compression space the communication between said cooler and said further expansion space and effecting a communication between said second expansion space and said compression space.

12. A hot gas reciprocating apparatus as claimed in claim 11 further comprising a plurality of rolling diaphragm seals, a third expansion space, a second gap seal between said third expansion space and said compression space, said second gap seal being arranged in the apparatus such that said second and third expansion spaces communicate with one another.

13. A hot gas reciprocating apparatus comprising a cylinder, two piston-shaped members in said cylinder adapted for reciprocating movement therein, three intercommunicating spaces in said cylinder having a volume which is varied by said two piston-shaped members with a phase difference so that in one space substantial compression occurs and in the other two spaces substantial expansion occurs, a higher average temperature prevailing in one of said expansion spaces while a lower average temperature prevails in the other expansion space than said compression space, a plurality of heat exchangers, each of said expansion spaces communicating through one of said heat exchangers with said compression space, two separate ducts connecting at least one of said heat exchangers with one of said expansion spaces, and at least one of said expansion spaces communicating through one of said separate ducts and one of said heat exchangers to said compression space, a cooler in at least one of said ducts, and a control mechanism permitting the flow of said medium to said expansion space through one of said ducts and the flow of said medium from said expansion space through the other of said ducts.

14. A hot gas reciprocating apparatus as claimed in claim 13 further comprising ports through which said separate ducts open into said cylinder, at least one of said piston-shaped members being provided with recesses which co-act with said ports whereby the latter are alternately opened and closed.

15. A hot gas reciprocating apparatus as claimed in claim 13 wherein a heat exchanger is incorporated in the other of said separate ducts whereby the working medium is cooled in said one duct by counter-current flow relative to a cooling medium, and said heat exchanger in said other duct is heated by means of said working medium being in counter-current flow with a warmer medium.

16. A hot gas reciprocating apparatus comprising means forming a compression space for said apparatus, means forming an expansion space for said apparatus, said spaces being provided with a working medium of variable volume, a first piston adapted for reciprocation in at least one of said means, a second piston adapted for reciprocation in another of said means and out of phase with said first piston, said spaces when operative having different average temperatures and having means for communicating with each other, a first heat exchanger arranged in said communicating means between said spaces, at least two separate ducts in said communicating means connecting said first heat exchanger with one of said spaces, a control device in said apparatus which when said working medium flows in one direction conducts said working medium through one of said separate ducts and when said working medium flows in the other direction conducts said working medium through the other of said separate ducts, and at least one of said ducts comprising a second heat exchanger wherein said working medium exchanges heat.

References Cited by the Examiner

UNITED STATES PATENTS

| | | | |
|---|---|---|---|
| 3,078,683 | 2/1963 | Dros | 62—6 |
| 3,101,597 | 8/1963 | Dros | 62—6 |
| 3,214,924 | 11/1965 | Van Geuns | 62—6 |

WILLIAM J. WYE, *Primary Examiner.*